United States Patent [19]

Iwasaki et al.

[11] Patent Number: 5,684,784
[45] Date of Patent: Nov. 4, 1997

[54] CAV RECORDING/ REPRODUCING APPARATUS FOR DIVIDING INPUT DATA IN AN AMOUNT PROPORTIONAL IF THE RADIAL LENGTHS OF A PLURALITY OF RECORDING AREAS

[75] Inventors: Yasuo Iwasaki; Nobuhiro Chiba, both of Kanagawa, Japan

[73] Assignee: Sony Corporation, Tokyo, Japan

[21] Appl. No.: 565,076

[22] Filed: Nov. 30, 1995

[30] Foreign Application Priority Data

Dec. 6, 1994 [JP] Japan .................. 6-301940

[51] Int. Cl.⁶ .................. G11B 7/007
[52] U.S. Cl. .................. 369/124; 369/275.3; 369/48; 369/59; 369/32
[58] Field of Search .................. 369/124, 275.1, 369/275.3, 32, 48, 49, 59, 44.37, 44.38, 58

[56] References Cited

U.S. PATENT DOCUMENTS

| | | | |
|---|---|---|---|
| 5,446,724 | 8/1995 | Tabe et al. | 369/275.1 |
| 5,493,548 | 2/1996 | Kamioka | 369/44.37 |
| 5,506,825 | 4/1996 | Gushima et al. | 369/44.37 |
| 5,557,594 | 9/1996 | Chiba et al. | 369/59 |
| 5,570,342 | 10/1996 | Kosaka | 369/291 |

FOREIGN PATENT DOCUMENTS 7-296521  11/1995  Japan .................. G11B 20/12

*Primary Examiner*—David C. Nelms
*Assistant Examiner*—Kim-Kwok Chu
*Attorney, Agent, or Firm*—Limbach & Limbach L.L.P.

[57] ABSTRACT

A data recording apparatus which simultaneously records data to a plurality of radially divided recording areas of a disc recording medium by the CAV method, including a data dividing unit for dividing the input data into amounts of data proportional to the radial lengths of the plurality of recording areas and a plurality of data recording units for simultaneously recording the data to the corresponding recording areas at data recording rates proportional to the radial lengths of the recording areas; a data reproducing apparatus which reproduces data recorded by such a data recording apparatus including a plurality of data reproducing units, provided corresponding to the data recording areas, for simultaneously reproducing data from the recording areas, and a data rearranging unit for rearranging the data reproduced from the recording areas to the same order as the original input data; and a data recording/reproducing apparatus including such a data recording apparatus and data reproducing apparatus.

18 Claims, 6 Drawing Sheets

SB : DATA SYNC
RS : DATA RESYNC
D : RECORDING DATA (REPRODUCING DATA)
P : DM POINTER
C : CRC DATA
E : ECC

CAV RECORDING/ REPRODUCING APPARATUS FOR DIVIDING INPUT DATA IN AN AMOUNT PROPORTIONAL IF THE RADIAL LENGTHS OF A PLURALITY OF RECORDING AREAS

BACKGROUND OF THE INVENTION

1. Field of the Invention

The present invention relates to a data recording apparatus, a data reproducing apparatus, and a data recording/reproducing apparatus for use with a disc recording medium, e.g., a magnetic-optical disc (MO) disc.

2. Description of the Related Art

Proposed in the related art has been a data recording/reproducing system which divides a disc recording medium into a plurality of recording areas in its radial direction and uses separate recording/reproducing units for each of those recording areas to enable simultaneous recording and reproduction to and from those areas and thereby achieve a higher rate of data transfer with outside apparatuses.

Two methods have been proposed for realizing such a data recording/reproducing system using disc recording/reproducing apparatuses of the constant angular velocity (CAV) type: the method of dividing the data into equal amounts of data to each recording area and recording the data at different data rates for each area and the method of dividing the data into different amounts of data to each recording area and recording the data at the same data rates.

No matter which method is used, however, to realize this data recording/reproducing system using CAV disc recording/reproducing apparatuses, it suffers from the disadvantage that the recording capacity of the disc recording medium cannot be used to the maximum extent.

SUMMARY OF THE INVENTION

The present invention was made in consideration of the above disadvantage and has as its object to provide a data recording apparatus, a data reproducing apparatus, and a data recording/reproducing apparatus that enable realization of a data recording/reproducing system which divides a disc recording medium into a plurality of recording areas in the radial direction and uses recording/reproducing units which correspond to these recording areas to simultaneously record and reproduce data to/from these areas by the CAV method.

Another object is to make the transfer data rate between outside apparatuses and the data recording/reproducing system higher.

A still other object is to enable use of the maximum recording capacity of the disc recording medium.

To achieve the above objects, according to a first aspect of the present invention, there is provided a data recording apparatus which simultaneously records data to a plurality of radially divided recording areas of a disc recording medium by the CAV method, including a data dividing means for dividing the input data into amounts of data proportional to the radial lengths of the plurality of recording areas and a plurality of data recording means for simultaneously recording the divided data to the proportional recording areas at data recording rates proportional to the radial lengths of the recording areas.

Preferably, the data dividing means divides the input data into amounts of data substantially proportional to the minimum radial lengths of the recording areas, and each data recording means records the divided data at a data rate substantially proportional to the minimum radial length of each corresponding recording area.

Preferably, data used for reproducing recorded data are recorded on the radially divided recording areas of the disc recording medium before recording the divided data at the disc recording areas.

Preferably, the apparatus is further provided with an error correction code (ECC) generating means for generating ECCs from the data and inserting the ECCS into the data, and the plurality of data recording means simultaneously record the divided data with the ECCS to the corresponding recording areas.

According to a second aspect of the invention, there is provided a data reproducing apparatus which reproduces data recorded by any of such data recording apparatuses including a plurality of data reproducing means, provided corresponding to the data recording areas, for simultaneously reproducing data from the recording areas, and a data rearranging means for rearranging the data reproduced from the recording areas to the same order as the original input data.

Preferably, each data reproducing means of the data reproducing apparatus reproduces data from each corresponding recording area at a data rate substantially proportional to the minimum radial length of each corresponding recording area.

Preferably, the data reproducing apparatus further comprises an error correcting means for correcting errors in the data reproduced from the recording areas using the ECCs inserted in the reproduced data.

According to a third aspect of the present invention, there is provided a data recording/reproducing apparatus comprising any of such data recording apparatuses and any of such data reproducing apparatuses.

BRIEF DESCRIPTION OF THE DRAWINGS

These and other objects and features of the present invention will be clear from the following description of the preferred embodiments made with reference to the attached drawings, in which.

DESCRIPTION OF THE PREFERRED EMBODIMENTS

Preferred embodiments of the present invention will now be explained in detail with reference to the drawings.

Figure 1:
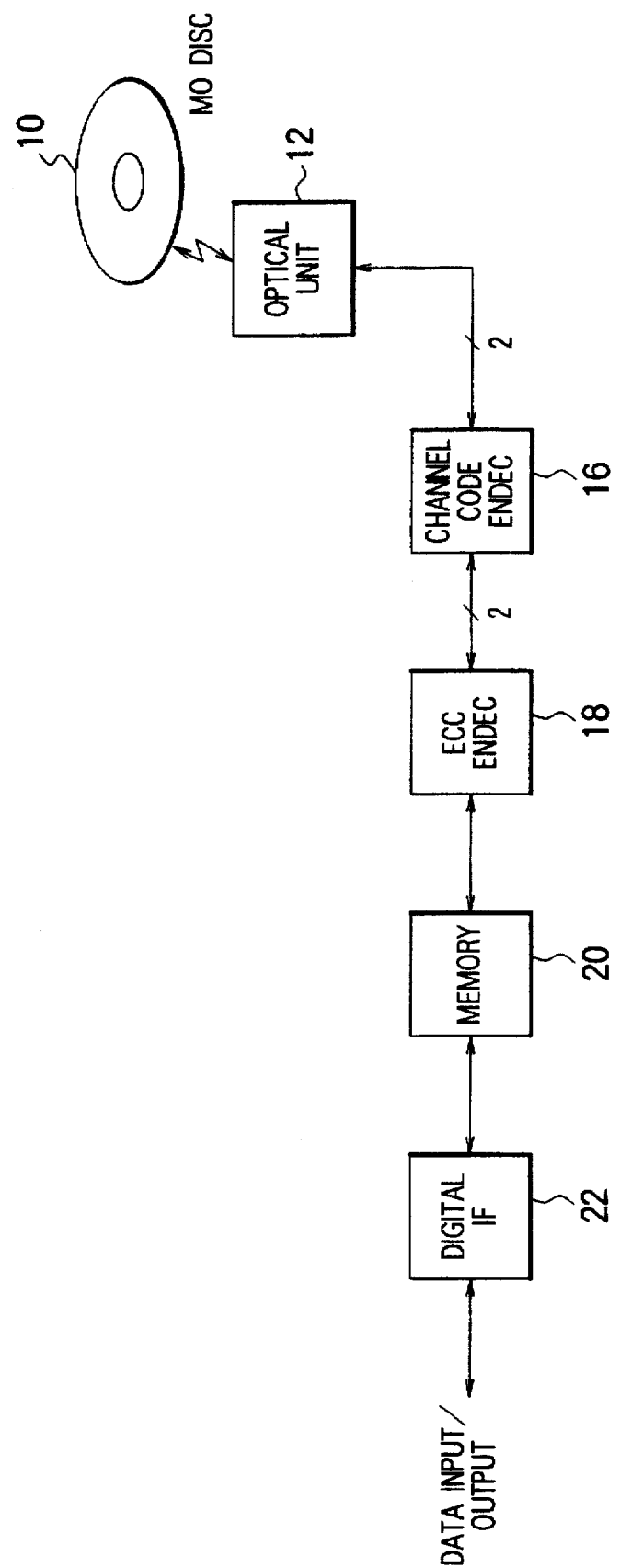
FIG. 1 is a block diagram of a data recording/reproducing apparatus according to an embodiment of the present invention.
Figure 2:
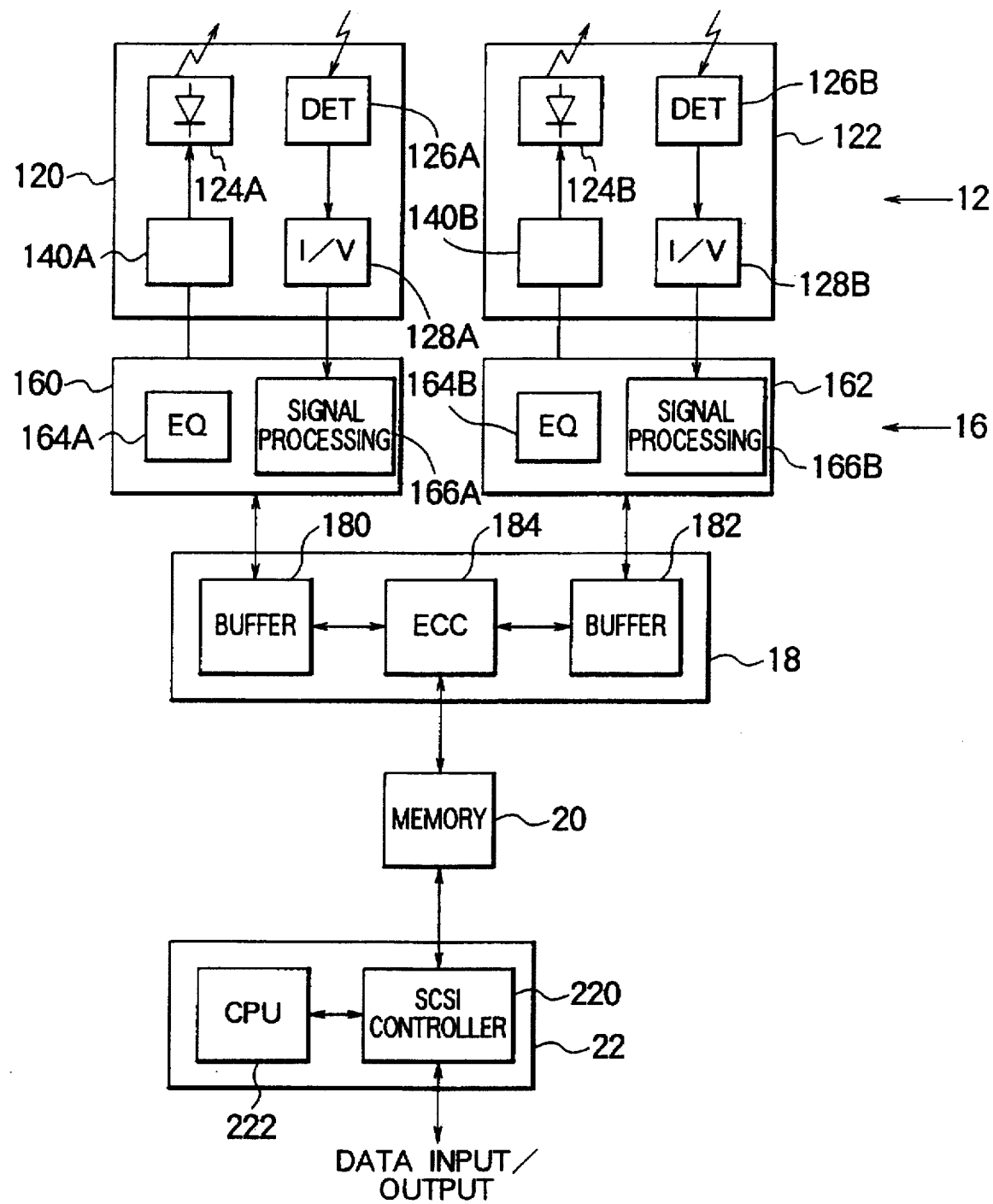
FIG. 2 is a detailed block diagram of the data recording/reproducing apparatus shown in FIG. 1.

As shown in FIG. 1 and FIG. 2, the data recording/reproducing apparatus 1 includes an optical unit 12, an encoding/decoding unit (CHANNEL CODE ENDEC) 16, an ECC generating/error correcting unit (ECC ENDEC) 18, a memory circuit 20, and a digital interface circuit (digital IF circuit) 22.

Figure 3:
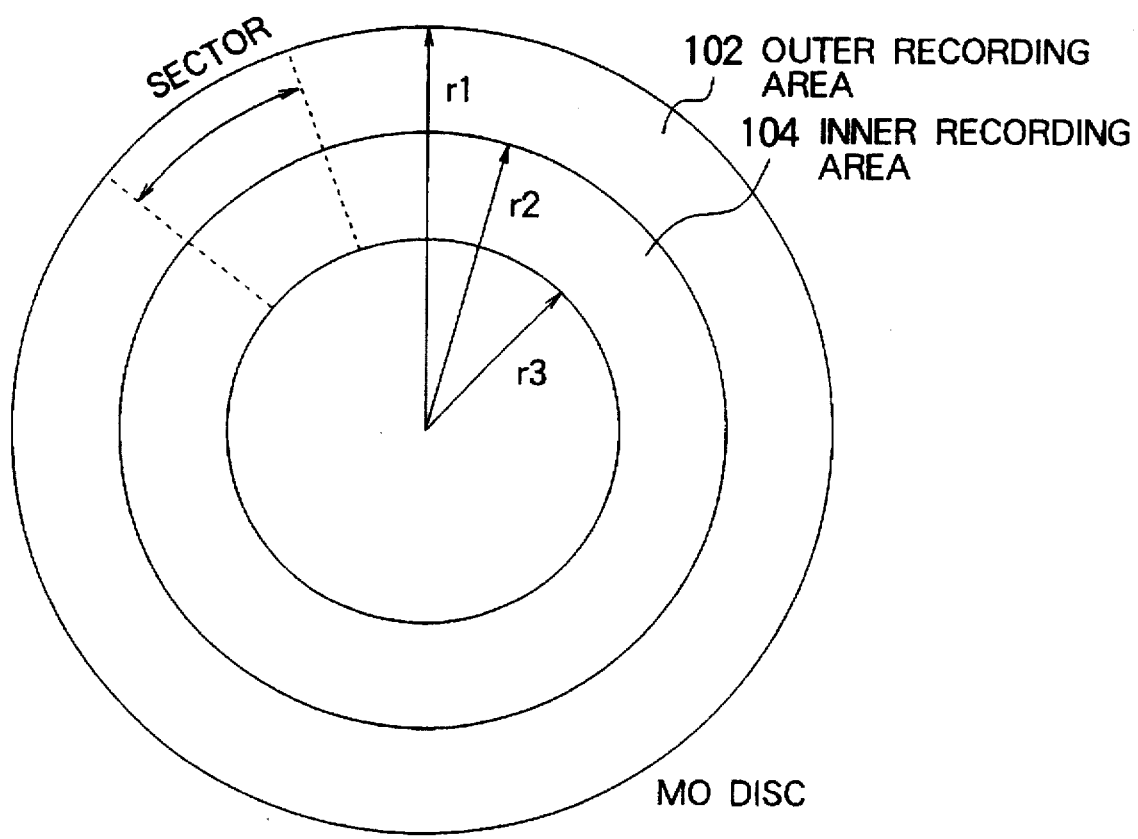
FIG. 3 is a view showing the recording areas of the MO disc shown in FIG. 1.

As shown in FIG. 3, the recording surface of the MO disc 10 is divided into two recording areas, i.e., the recording areas 102 and 104, of the maximum radial lengths r1 and r2 and the minimum radial lengths r2 and r3, respectively. The proportion of the radial lengths is, for example, r1:r2:r3= 5:3:2.

The data recording/reproducing apparatus 1 uses the recording/reproducing units 120 and 122 (FIG. 2) provided for the recording areas 102 and 104, respectively, to simultaneously record data on the recording areas 102 and 104 in parallel and simultaneously reproduce data from recording areas 102 and 104 in parallel.

As shown in FIG. 2, the optical unit 12 includes the recording/reproducing units 120 and 122.

The recording/reproducing unit 120 comprises a laser diode (LD) 124A, a laser driver circuit 140A, a photo detector (DET) 126A, and a current/voltage converter (I/V converter) 128A.

The recording/reproducing unit 122 comprises a laser diode 124B, a laser driver circuit 140B, a photo detector 126B, and an I/V converter 128B.

The encoding/decoding unit 16 includes encoding/decoding circuits 160 and 162 corresponding to the recording/reproducing units 120 and 122, respectively.

The encoding/decoding circuit 160 includes an equalizer circuit 164A and a signal processing circuit 166A.

The encoding/decoding circuit 162 includes an equalizer circuit 164B and a signal processing circuit 166B.

The ECC generating/error correcting unit 18 includes buffer circuits 180 and 182, corresponding to the encoding/decoding circuits 160 and 162, respectively, an ECC generating/error correcting circuit 184.

The digital IF circuit 22 includes a small computer system interface (SCSI) controller circuit 220 and a controller circuit 222 using a CPU.

The photo detecter 126A detects the laser beam irradiated to the recording area 102 of the MO disc 10 by the laser diode 124A of the recording/reproducing unit 120 and reflected by the recording area 102, converts the optical signal to a current signal, and outputs the current signal to the I/V converter 128A.

The photo detecter 126B detects the laser beam irradiated to the recording area 104 of the MO disc 10 by the laser diode 124B of the recording/reproducing unit 122 and reflected by the recording area 104, converts the optical signal to a current signal, and outputs the current signal to the I/V converter 128B.

The I/V converter 128A converts the current signal from the photo detector 126A to a voltage signal and outputs the signal to the encoding/decoding circuit 160.

The I/V converter 128B converts the current signal from the photo detector 126B to a voltage signal and outputs the signal to the encoding/decoding circuit 162.

The equalizer circuit 164A of the encoding/decoding circuit 160 equalizes the voltage signal from the I/V converter 128A and outputs it to the signal processing circuit 166A.

The equalizer circuit 164B of the encoding/decoding circuit 162 equalizes the voltage signal from the I/V converter 128B and similarly outputs it to the signal processing circuit 166A.

The signal processing circuit 166A processes the equalized voltage signal from the equalizer circuit 164A by the run length limited (1,7) (RLL (1,7)) decoding method to convert the voltage signal to digital data and outputs the data to the ECC generating/error correcting unit 18.

During recording, the signal processing circuit 166A also processes data to be recorded by the RLL (1,7) coding method, modulates it, and outputs it to the laser driver circuit 140A.

For reproducing, the signal processing circuit 166B processes the equalized voltage signal from the equalizer circuit 164B by the RLL (1,7) decoding method, converts the voltage signal to digital data, and outputs the data to the ECC generating/error correcting unit 18.

For recording, the signal processing circuit 166B also processes data by the RLL (1,7) coding method, modulates it, and outputs it to the laser driver circuit 140B.

By the processing of the encoding/decoding circuits 160 and 162 as described above, the characteristics of the signals between the ECC generating/error correcting unit 18 and the recording/reproducing units 120 and 122 are matched to enable effective recording and reproducing with respect the recording areas 102 and 104 of the MO disc 10.

The buffer circuit 180 temporarily stores the data provided from the ECC generating/error correcting unit 18 and the data provided from the encoding/decoding circuit 160.

The buffer circuit 182 temporarily stores the data provided from the ECC generating/error correcting unit 18 and the data provided from the encoding/decoding circuit 162.

For recording, the ECC generating/error correcting circuit 184 generates error correcting codes (ECCs) from data input from the memory circuit 20, inserts them to the input data, divides the input data with the ECCs into two amounts of recording data proportional to the radial lengths of the recording area 102 and 104 respectively, and stores them in the buffer circuits 180 and 182.

For reproducing, the ECC generating/error correcting circuit 184 corrects the error of the data reproduced from the encoding/decoding circuits 160 and 162 using the ECCS in the data and output the data to the memory circuit 20.

The memory circuit 20 stores the data from the ECC generating/error correcting circuit 184 and the input data from the digital IF circuit 22.

For recording, the SCSI controller circuit 220 receives input data from external data processing equipment (not shown in FIG. 1 and FIG. 2), e.g., computers, with SCSI protocol under the control of the controller circuit 222 and outputs it to the memory circuit 20.

For reproduction, the SCSI controller circuit 220 rearranges the order of the data stored in the memory circuit 20 to the order of the original input data and output it to outside apparatuses with SCSI protocol.

The processes of the data recording/reproducing apparatus 1 are described below.

First, the recording process will be described.

First, data is input into the digital IF circuit 22 from an outside apparatus.

The digital IF circuit 22 receives the input data with SCSI protocol and stores it in the memory circuit 20.

The ECC generating/error Correcting circuit 184 generates ECCs from the input data, inserts them into the input data, divides the input data with the ECCs into two amounts of recording data proportional to the minimum radial lengths of the recording areas 102 and 104 of the MO disc 10, and outputs them to the buffer circuits 180 and 182.

Here, assuming the proportion of the minimum radial lengths of the recording areas 102 and 104 is 3:2, the ECC generating/error correcting circuit 184 in essence distributes three-fifths of the input data with the ECCs to the recording area 102 (the outer recording area of the MO disc 10) and two-fifths of the input data to the recording area 104 (the inner recording area of the MO disc 10).

For example, if the data blocks D1, D2, D3, D4, and D5 are input to the ECC generating/error correcting circuit 184, the circuit 184 generates ECCs (shown in FIG. 5 and 6) for the data blocks D1, D2, and D3, inserts them to the data blocks D1, D2, and D3, and stores the results in the buffer circuit 180. Similarly, the ECC generating/error correcting circuit 184 generates ECCs for the data blocks D4 and D5, inserts them to the data blocks D4 and D5, and stores them in the buffer circuit 182.

The encoding/decoding circuit 160 reads the data from the buffer circuit 180, multiplexes the data to fit the recording data format (shown in FIG. 4A, 4B, and 4C), encodes and modulates the data, and outputs it to the recording/reproducing unit 120.

The encoding/decoding circuit 162 reads the data from the buffer circuit 182, multiplexes the data to fit the recording data format, encodes and modulates the data, and outputs it to the recording/reproducing unit 122.

The data rates used for recording at the recording areas 102 and 104 will be described below.

The recording/reproducing unit 122 records data to the recording area 104 of the MO disc rotating at a constant angular velocity at a data rate suitable for both the data recording/reproducing apparatus 1 and the MO disc 10. The recording/reproducing unit 120 records data to the recording area 102 at a data rate greater than the data rate for the recording area 104 by an amount proportional to the difference in radial lengths of the recording area 102 and 104, for example, a rate 1.5 times greater.

Note that the wavelengths of the recording data at the recording areas, i.e., at the recording areas 102 and 104, are determined by the velocity of the rotation of the MO disc 10 and data rates of the recording areas.

Therefore, when using a disc recording/reproducing apparatus of the CAV type in which the angular rotational velocity of the MO disc 10 is constant, the wavelength of the recording data becomes shortest at the innermost side of each recording area. Accordingly, by selecting the data rates so as to give the limit value of the wavelengths of the MO disc 10 and optical system 12 at the innermost sides of each recording area, the recording density of the MO disc can be made the highest.

Accordingly, by making both the amounts of data and data rates of the data provided to the recording areas 102 and 104 proportional to the minimum radial lengths of the recording areas 102 and 104, the highest data density of the MO disc 10 can be obtained.

Further, because the recording times of the recording areas 102 and 104 are equal, it becomes possible to record and reproduce to and from the MO disc 10 at a high speed.

The format of the recorded data will be described next.

The format of data recorded to the MO disc 10 is shown in FIGS. 4A, 4B, 4C, 5, and 6.

Figure 4A:
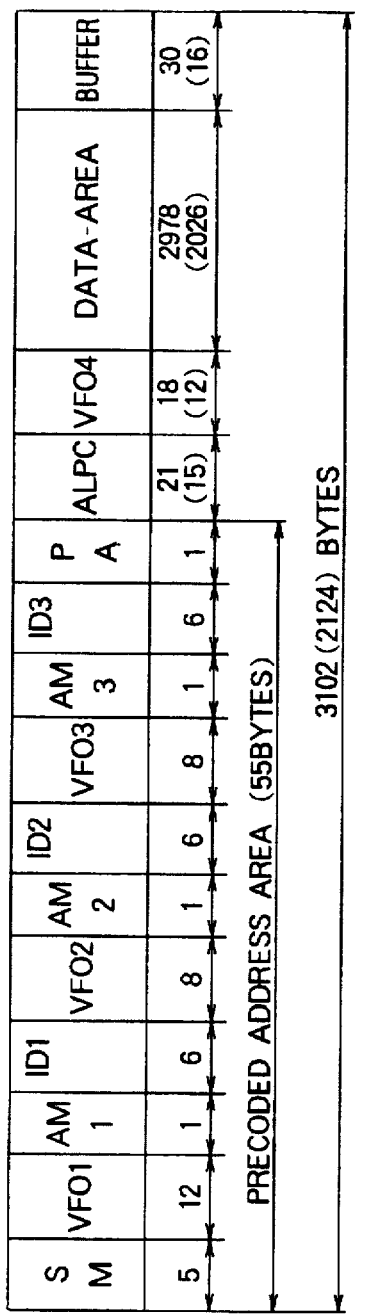
FIG. 4A is a view of the format of data recorded on the MO disc shown in FIG. 1.
Figure 4B:
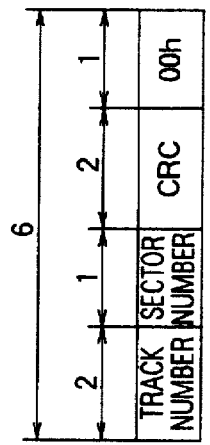
FIG. 4B is a view of the format of an ID area shown in FIG. 4A.
Figure 4C:
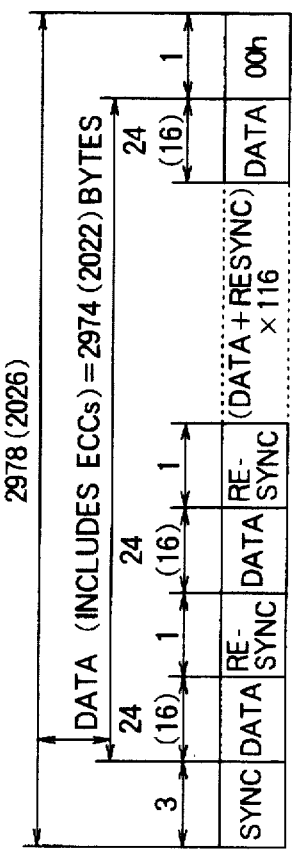
FIG. 4C is a view of the format of the data area shown in FIG. 4A.

Numbers of data shown in FIGS. 4A, 4B, and 4C without parentheses are data recorded in the recording area 102, while numbers of data shown in parentheses are data recorded in the recording area 104. All other data besides the data in the data recording areas have been recorded on the MO disc 10 in advance.

In the recording data format shown in FIG. 4A, each of the recording areas 102 and 104 has a plurality of sectors (42 sectors, for example). Each sector includes a precoded address area and data recording area.

The address area includes a sector marker SM followed by address data comprising variable frequency oscillator (VCO) data, an address marker (AM), and identification data (ID) recorded identically three times. The reason why the data is recorded three times is to ensure correct reproduction of the address data even if an error occurs. The VFO data is data for forming a single frequency signal used for pulling in the oscillation frequency of a phase locked loop (PLL) circuit to generate a reference signal (reference clock). The address data is followed by post-amble data.

The address data is all preformated data which is, for example, formed as pits on the MO disc 10 in advance of the recording.

Figure 5:
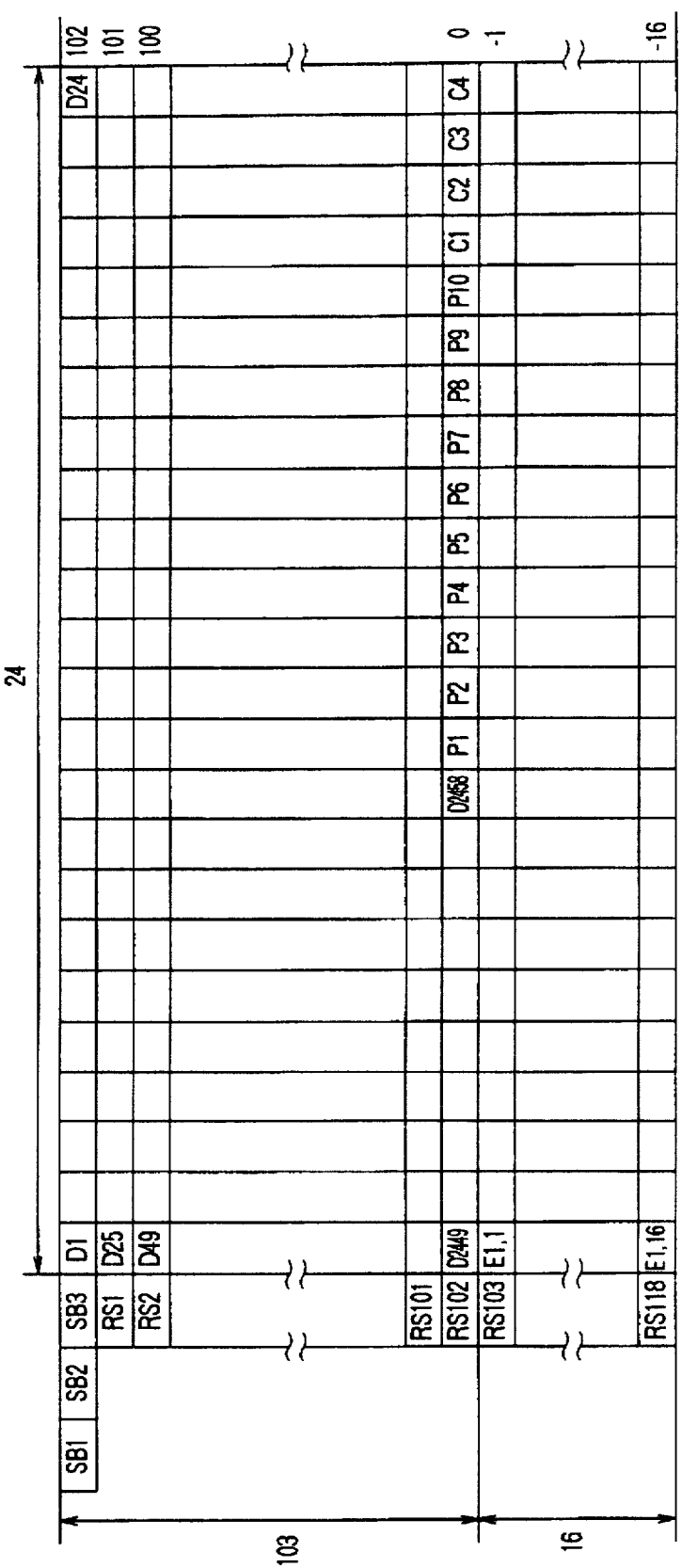
FIG. 5 is a view of the formats of the data area shown in FIG. 4A and FIG. 4B in the case of the outer recording area shown in FIG. 3.
Figure 6:
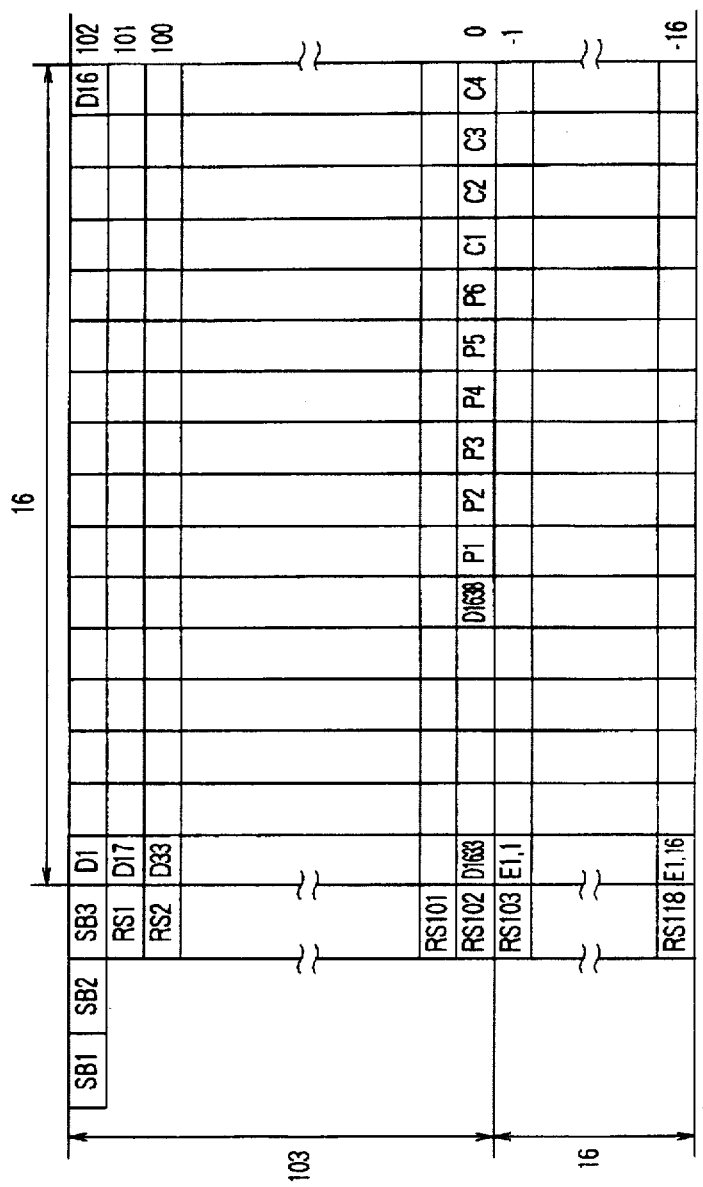
FIG. 6 is a view of the formats of the data area shown in FIG. 4A and FIG. 4B in the case of the inner recording area shown in FIG. 3.

The data recording area follows the address area. The framework of the recorded data and ECCs in the recording area 102 (outer recording area) is as shown in FIG. 5, and the framework of the recorded data and ECCs in the recording area 104 (inner recording area) is as shown in FIG. 6.

At the top of the data area, a test area is placed. In the test area are recorded data ALPC for control of the power of the laser diode followed by the VFO data VFO4 (same data as VFO1, VFO2, and VFO3).

At the end of the data area, a buffer area is provided where no data is recorded so as to clearly define the boundary between the data recording area and the address area.

The configuration of the identification data ID is shown in FIG. 4B. As shown in FIG. 4B, the identification data ID includes data which shows the track number of the MO disc 10, data which shows the sector number of the track, data check codes CRC, and fixed data 00h (zero data of hexadecimal code).

At the top of the data area, the data SYNC (synchronization data) is recorded. Following the data SYNC, 119 blocks of recorded data are recorded.

Next, the process of the data recording/reproducing apparatus 1 for reproducing data from the MO disc 10 will be described below.

The recording/reproducing unit 122 reads the signals from the recording area 104 of the MO disc 10 at a data rate the same as the recording data rate, while the recording/reproducing unit 120 reads the signals from the recording area 102 at a data rate 1.5 the data rate of the unit 122. The units 120 and 122 output the signals to the encoding/decoding circuits 160 and 162.

The proportion of the data rates by which the recording/reproducing units 120 and 122 read signals from the recording areas 102 and 104 of the MO disc 10 is the same as that of the data rates used when recording the data to the recording areas 102 and 104.

The configuration of the data recorded at the data recording areas 102 and 104 is shown in FIGS. 4C, 5, and 6.

At the top of the data area, data SYNC which is used for the establishment of the synchronization of the data blocks is recorded. A total of 119 data blocks are recorded following the data SYNC.

Further, a total of 118 data RESYNCs used for resynchronization of the data blocks are recorded between 119 data blocks of the recorded data.

At the end of the data area, the fixed data 00h (zero data of hexadecimal code) is recorded.

The encoding/decoding circuit 160 equalizes the signal which is input from the the recording/reproducing unit 120, demodulates the signal, converts it to digital data, demultiplexes the data from the format shown in FIGS. 4A, 4B, 4C, 5, and 6, decodes it by the RLL (1,7) decoding method, and takes out the reproduction data included in the data area and outputs it to the buffer circuit 180.

The encoding/decoding circuit 162 equalizes the signal which is input from the the recording/reproducing unit 122, demodulates the signal, converts it to digital data, demultiplexes the data, decodes it by the RLL (1,7) decoding method, and takes out the reproduction data included in the data area and outputs it to the buffer circuit 182.

The ECC generating/error correcting circuit 184 corrects the errors of the reproduced data using the ECCs inserted in the data from the buffer circuits 180 and 182, removes the ECCs from the data, and outputs the data to the memory circuit 20.

The digital IF circuit 22 rearranges the order of the data stored in the memory circuit 20 to the order of the original input data and outputs the data to the outside apparatuses, e.g., computers, with SCSI protocol. According to the above example, the ECC generating/error correcting circuit 184 stores in the memory circuit 20 the data blocks R1, R2, and R3 read from the buffer circuit 180 and corresponding to the input data blocks D1, D2, and D3 and the data blocks R4 and R5 read from the buffer circuit 182 and corresponding the input data blocks D4 and D5, while the digital IF circuit 22 reads the data stored in the memory circuit 20 in order, i.e., R1, R2, R3, R4, and R5 and outputs it in this order to the outside.

Because the data recording/reproducing apparatus 1 records and reproduces to/from the recording areas of the MO disc 10 as described above, it can record and reproduce data at a higher speed than the the data recording/reproducing apparatus of the related art.

Further, the data recording/reproducing apparatus 1 can be modified to record and reproduce data faster by radially dividing the recording surface of the MO disc 10 into three or more recording areas and providing a recording/reproducing unit of the optical unit 12, encoding/decoding unit 16, and buffer circuit and the ECC generating/error correcting circuit 184 of the ECC generating/error correcting unit 18 for each recording area.

Other recording data formats of other standards can also be used besides the recording data format shown in FIGS. 4A, 4B, 4C, 5, and 6.

The data recording/reproducing apparatus 1 can also be modified for recording to a magnetic recording medium e.g., a hard disc, by changing the optical unit to a magnetic unit which is suitable for magnetic data recording.

As described above, according to the data recording apparatus, data reproducing apparatus, and data recording/reproducing apparatus of the present invention, it is possible to realize a data recording/reproducing system which divides a recording area of a disc recording medium into a plurality of recording areas in the radial direction and uses recording/reproducing units which correspond to these recording areas to simultaneously record and reproduce data to/from these areas by the CAV method.

Also, according to the present invention, it is achieved to make the transfer data rate between outside apparatuses and the data recording/reproducing system higher.

Further, according to the present invention, it is achieved to enable use of the maximum recording capacity of the disc recording medium, realize a data recording/reproducing system which divides a disc recording medium into a plurality of recording areas in the radial direction of the medium, uses recording/reproducing units which correspond to these recording areas, records and reproduces data to/from these recording area simultaneously.

Further, it is possible to make the transfer data rate between outside apparatuses and the data recording/reproducing system higher.

Still further, it is possible to use the maximum recording capacity of the disc recording medium.

What is claimed is:

1. A data recording apparatus which simultaneously records data to a plurality of radially divided recording areas of a disc recording medium by a CAV method, comprising:
   a data dividing means for dividing the input data into amounts of data proportional to the radial lengths of the plurality of recording areas and
   a plurality of data recording means for simultaneously recording the divided data to the corresponding recording areas at data recording rates proportional to the radial lengths of the recording areas.

2. A data recording apparatus as set forth claim 1, wherein the data dividing means divides the input data into amounts of data substantially proportional to the minimum radial lengths of the recording areas, and each data recording means records the divided data at a data rate substantially proportional to the minimum radial length of each corresponding recording area.

3. A data recording apparatus as set forth claim 2, wherein data used for reproducing recorded data are recorded on the radially divided recording areas of the disc recording medium before recording data at the disc recording areas.

4. A data recording apparatus as set forth claim 2, further comprising:
   an error correction code (ECC) generating means for generating ECCs from the divided data and inserting the ECCs into the divided data, the plurality of data recording means simultaneously recording the divided data with the ECCs to the corresponding recording areas.

5. A data recording apparatus as set forth claim 1, further comprising:
   an error correction code (ECC) generating means for generating ECCs from the divided data and inserting the ECCs into the divided data, the plurality of data recording means simultaneously recording the divided data with the ECCs to the corresponding recording areas.

6. A data recording apparatus as set forth claim 1, wherein data used for reproducing recorded data are recorded on the radially divided recording areas of the disc recording medium before recording data at the disc recording areas.

7. A data reproducing apparatus which reproduces data recorded by a data recording apparatus which simultaneously records data to a plurality of radially divided recording areas of a disc recording medium by a CAV method, including a data dividing means for dividing the input data into amounts of data proportional to the radial lengths of the plurality of recording areas and a plurality of data recording means for simultaneously recording the divided data to the corresponding recording areas at data recording rates proportional to the radial lengths of the recording areas, said data reproducing apparatus comprising:
   a plurality of data reproducing means provided corresponding to the data recording areas for simultaneously reproducing data from the corresponding recording areas
   and data rearranging means for rearranging the divided data reproduced from the recording areas to the same order as the original input data.

8. A data reproducing apparatus as set forth in claim 7, wherein each data reproducing means reproduces the divided data from each corresponding recording area at a data rate substantially proportional to the minimum radial length of each corresponding recording area.

9. A data reproducing apparatus as set forth in claim 8, further comprising:

an error correction means for correcting errors in the data reproduced from the recording areas using the ECCs inserted in the divided data.

10. A data reproducing apparatus which reproduces data recorded by a data recording apparatus which simultaneously records data to a plurality of radially divided recording areas of a disc recording medium by a CAV method, including a data dividing means for dividing the input data into amounts of data proportional to the radial lengths of the plurality of recording areas, an ECC generating means for generating error correcting codes (ECCs) from the data and inserting ECCs to the divided data, and a plurality of data recording means for simultaneously recording the data with the ECCs to the corresponding recording areas at data recording rates proportional to the radial lengths of the recording areas, wherein the data dividing means divides the input data into amounts of data substantially proportional to the minimum radial lengths of the recording areas, and each data recording means records the divided data at a data rate substantially proportional to the minimum radial length of each corresponding recording area, said data reproducing apparatus comprising:

a plurality of data reproducing means provided corresponding to the data recording areas for simultaneously reproducing data from the corresponding recording areas and data rearranging means for rearranging the divided data reproduced from the recording areas to the same order as the original input data.

11. A data reproducing apparatus as set forth in claim 10, wherein each data reproducing means reproduces the divided data from each corresponding recording area at a data rate substantially proportional to the minimum radial length of each corresponding recording area.

12. A data reproducing apparatus as set forth in claim 10, further comprising an error correction means for correcting errors in the data reproduced from the recording areas using the ECCs inserted in the divided data.

13. A data reproducing apparatus which reproduces data recorded by a data recording apparatus which simultaneously records data to a plurality of radially divided recording areas of a disc recording medium by a CAV method, including a data dividing means for dividing the input data into amounts of data proportional to the radial lengths of the plurality of recording areas and a plurality of data recording means for simultaneously recording the divided data to the corresponding recording areas at data recording rates proportional to the radial lengths of the recording areas, wherein the data dividing means divides the input data into amounts of data substantially proportional to the minimum radial lengths of the recording areas, and each data recording means records the divided data at a data rate substantially proportional to the minimum radial length of each corresponding recording area, said data reproducing apparatus comprising:

a plurality of data reproducing means provided corresponding to the data recording areas for simultaneously reproducing data from the corresponding recording areas and data rearranging means for rearranging the divided data reproduced from the recording areas to the same order as the original input data.

14. A data reproducing apparatus as set forth in claim 13, wherein each data reproducing means reproduces the divided data from each corresponding recording area at a data rate substantially proportional to the minimum radial length of each corresponding recording area.

15. A data reproducing apparatus which reproduces data recorded by a data recording apparatus which simultaneously records data to a plurality of radially divided recording areas of a disc recording medium by a CAV method, including a data dividing means for dividing the input data into amounts of data proportional to the radial lengths of the plurality of recording areas, an ECC generating means for generating error correcting codes (ECCs) from the data and inserting ECCs to the divided data, and a plurality of data recording means for simultaneously recording the divided data with the ECCs to the corresponding recording areas at data recording rates proportional to the radial lengths of the recording areas, said data reproducing apparatus comprising:

a plurality of data reproducing means provided corresponding to the data recording areas for simultaneously reproducing data from the corresponding recording areas and data rearranging means for rearranging the divided data reproduced from the recording areas to the same order as the original input data.

16. A data reproducing apparatus as set forth in claim 15, wherein each data reproducing means reproduces the divided data from each corresponding recording area at a data rate substantially proportional to the minimum radial length of each corresponding recording area.

17. A data recording/reproducing apparatus comprising:

a data recording apparatus and a data reproducing apparatus;

said data recording apparatus simultaneously recording data to a plurality of radially divided recording areas of a disc recording medium by a CAV method and including:

a data dividing means for dividing the input data into amounts of data proportional to the radial lengths of the plurality of recording areas and a plurality of data recording means for simultaneously recording the divided data to the corresponding recording areas at data recording rates proportional to the radial lengths of the recording areas; and said data reproducing apparatus including:

a plurality of data reproducing means provided corresponding to the data recording areas for simultaneously reproducing data from the corresponding recording areas and data rearranging means for rearranging the divided data reproduced from the recording areas to the same order as the original input data.

18. A data recording/reproducing apparatus as set forth in claim 17, wherein, said data dividing means divides the input data into amounts of data substantially proportional to the minimum radial lengths of the recording areas, each data recording means records the divided data at a data rate substantially proportional to the minimum radial length of each corresponding recording area, and each data reproducing means reproduces the divided data from each corresponding recording area at a data rate substantially proportional to the minimum radial length of each corresponding recording area.

* * * * *

UNITED STATES PATENT AND TRADEMARK OFFICE
CERTIFICATE OF CORRECTION

PATENT NO. : 5,684,784
DATED : November 4, 1997
INVENTOR(S) : YASUO IWASAKI ET AL.

It is certified that error appears in the above-identified patent and that said Letters Patent is hereby corrected as shown below:

In the title, line 3, replace "IF" with --TO--.
and column 1, line 3.

Signed and Sealed this

Fourteenth Day of April, 1998

Attest:

BRUCE LEHMAN

Attesting Officer   Commissioner of Patents and Trademarks